(12) United States Patent
Hosono (10) Patent No.: US 7,259,484 B2
(45) Date of Patent: Aug. 21, 2007

(54) BRUSHLESS MOTOR

(75) Inventor: Toshikazu Hosono, Shizuoka-ken (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 11/357,061

(22) Filed: Feb. 21, 2006

(65) Prior Publication Data

US 2006/0214527 A1    Sep. 28, 2006

(30) Foreign Application Priority Data

Mar. 1, 2005    (JP)    ............... 2005-055617

(51) Int. Cl.
H02K 21/24    (2006.01)
H02K 11/00    (2006.01)

(52) U.S. Cl. ................. 310/51; 310/156.32; 310/68 B; 310/268

(58) Field of Classification Search ................ 310/179, 310/40, 10, 156.32, 268, 68 B, 51; 324/76.11; 335/220

See application file for complete search history.

(56) References Cited

U.S. PATENT DOCUMENTS 4,733,119 A * 3/1988 Shiraki et al. ............... 310/268
4,757,222 A * 7/1988 Shiraki et al. ............ 310/68 B
4,851,731 A * 7/1989 Saotome et al. ............ 310/258

FOREIGN PATENT DOCUMENTS

JP    6-2963    1/1994

* cited by examiner

Primary Examiner—Darren Schuberg
Assistant Examiner—Alex W. Mok
(74) Attorney, Agent, or Firm—Connolly Bove Lodge & Hutz LLP (57) ABSTRACT

A brushless motor 100 is composed of a motor base 10, a rotary shaft 25 rotatably supported by the motor base 10 through bearings 22 and 23, a back yoke 20 in a shape of flat plate made from a magnetic material being supported by the motor base 10 from one surface of the back yoke in a direction perpendicular to the rotary shaft 25 in a neighborhood of the rotary shaft 25, a plurality of driving coils 31 disposed on another surface of the back yoke 20 opposite to the one surface confronting with the motor base 10 and a rotor yoke 28 having a driving magnet 24 in the shape of ring integrally rotating together with the rotary shaft 25 while confronting the driving magnet 24 with the plurality of driving coils 31 with maintaining a prescribed gap G between them, wherein the plurality of driving coils 31 are disposed on the back yoke 20 around the rotary shaft 25 at angular intervals of a prescribed angle, and wherein the back yoke 20 is provided with a not disposed angular area S in which no driving coil 31 is disposed on the other surface of the back yoke 20 in an area within a prescribed angle around the rotary shaft 25, and the brushless motor 100 further comprising a press contacting means 34 for pressing the back yoke 20 toward the driving magnet 24 so as to deform the back yoke 20, wherein the press contacting means 34 is provided between the motor base 10 and the back yoke 20 in an area axially opposite to the not disposed angular area S with respect to the rotary shaft 25.

5 Claims, 11 Drawing Sheets

BRUSHLESS MOTOR

BACKGROUND OF THE INVENTION

1. Field of the Invention

The present invention relates to a brushless motor, which is small in rotational irregularity and low in vibration.

2. Description of the Related Art

Figure 8:
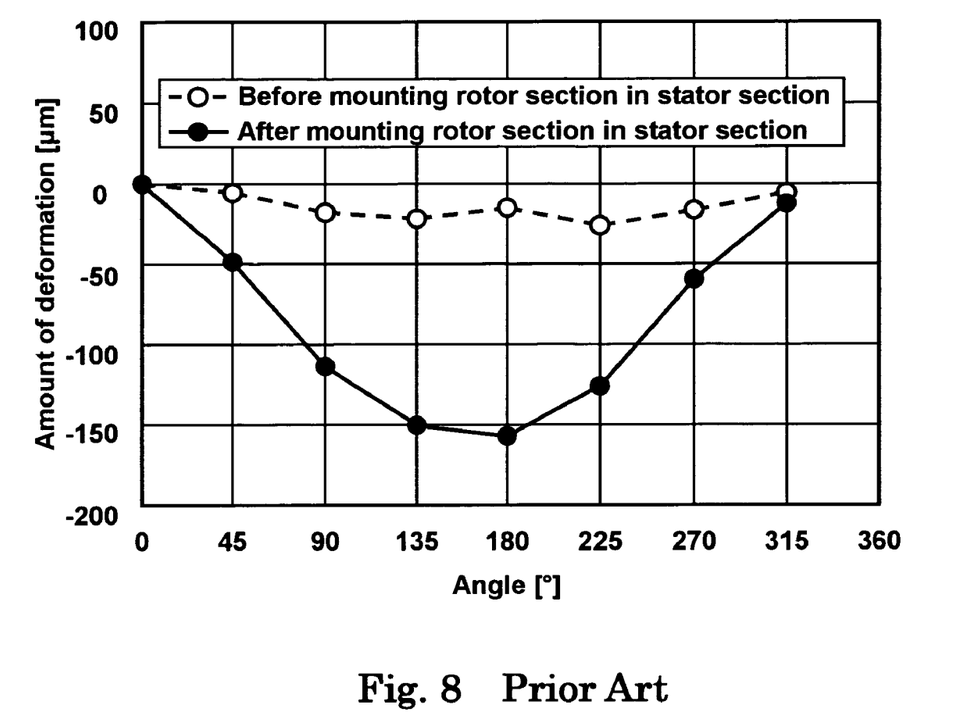
FIG. 8 is a graph exhibiting an amount of deformation of a back yoke in a brushless motor according to the prior art for explaining a flatness of the back yoke.

FIG. 8 is a graph exhibiting an amount of deformation of a back yoke in a brushless motor according to the prior art for explaining a flatness of the back yoke.

Figure 9:
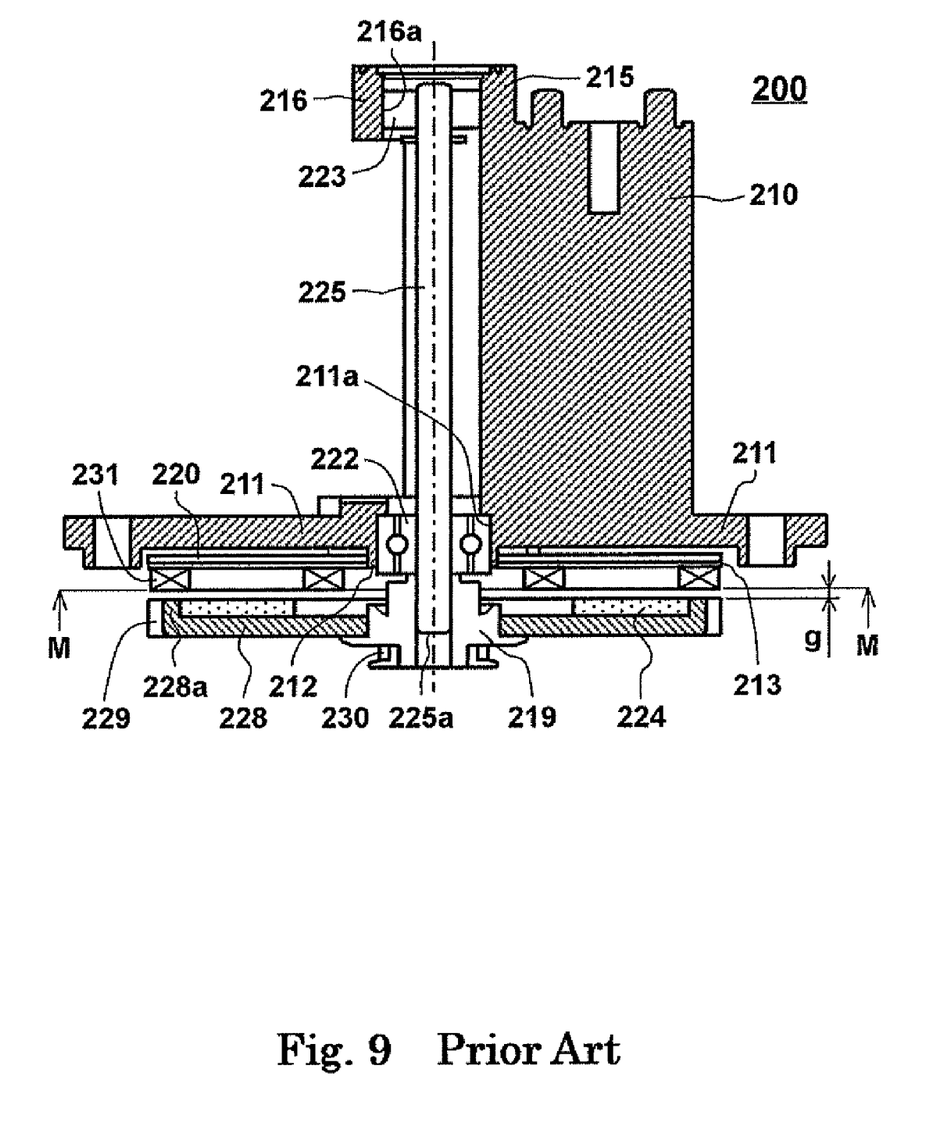
FIG. 9 is a cross sectional view of the conventional brushless motor according to the prior art.

FIG. 9 is a cross sectional view of the conventional brushless motor according to the prior art.

Figure 10:
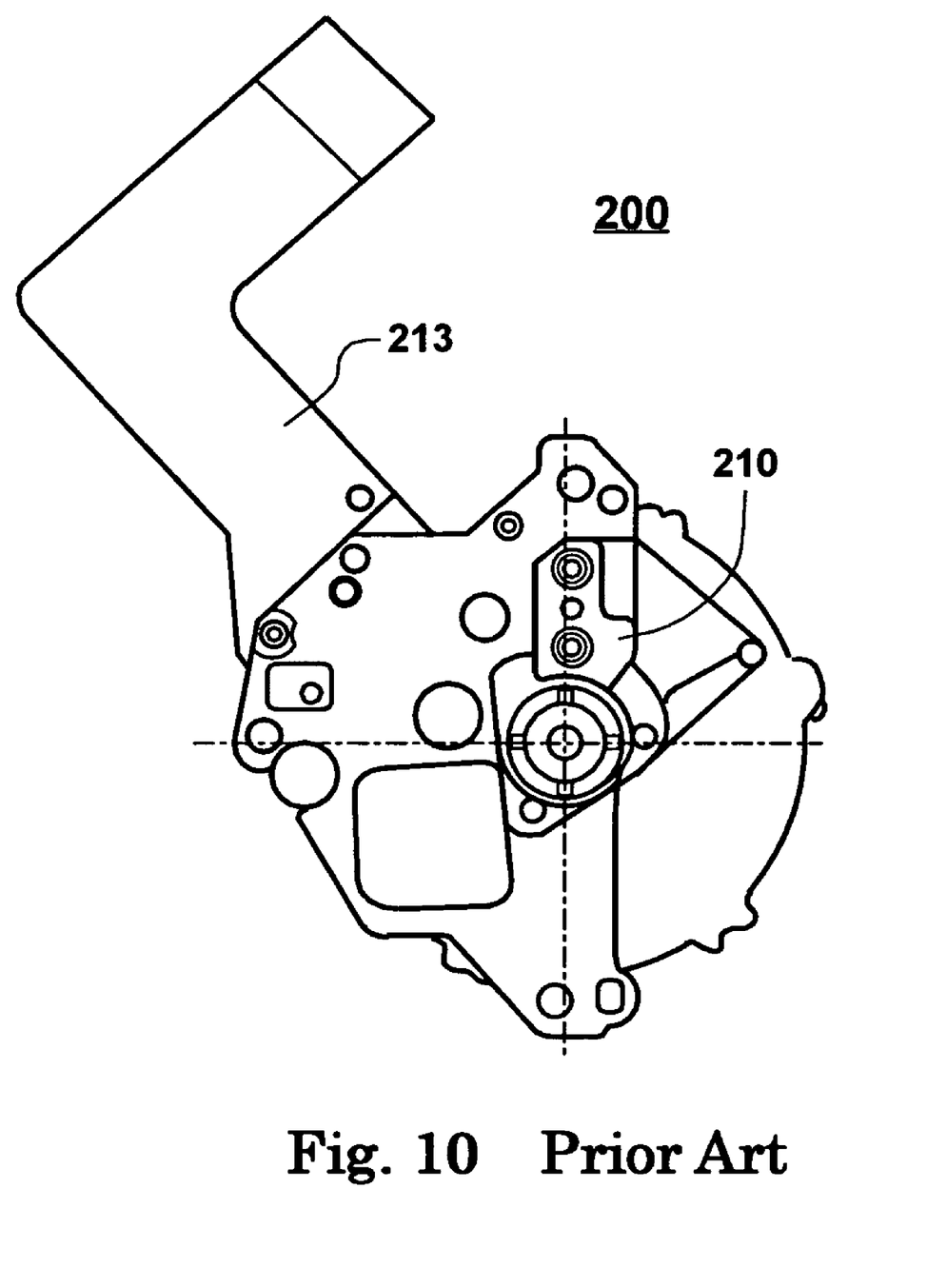
FIG. 10 is a plan view of the conventional brushless motor shown in FIG. 9.

FIG. 10 is a plan view of the conventional brushless motor shown in FIG. 9.

Figure 11:
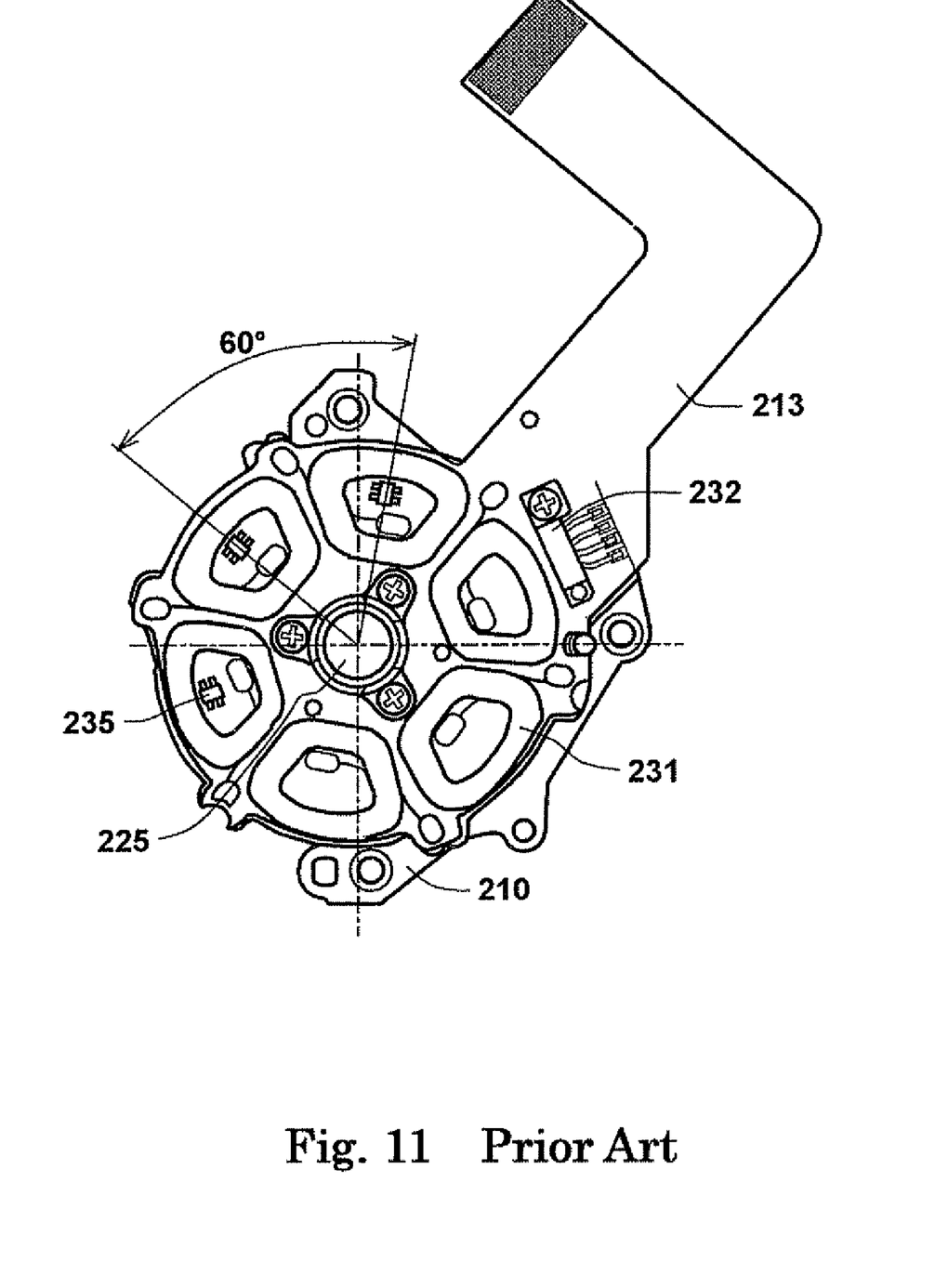
FIG. 11 is a fragmentary view taken in the direction of the arrows substantially along the line M-M of FIG. 9.

FIG. 11 is a fragmentary view taken in the direction of the arrows substantially along the line M-M of FIG. 9.

Figure 12:
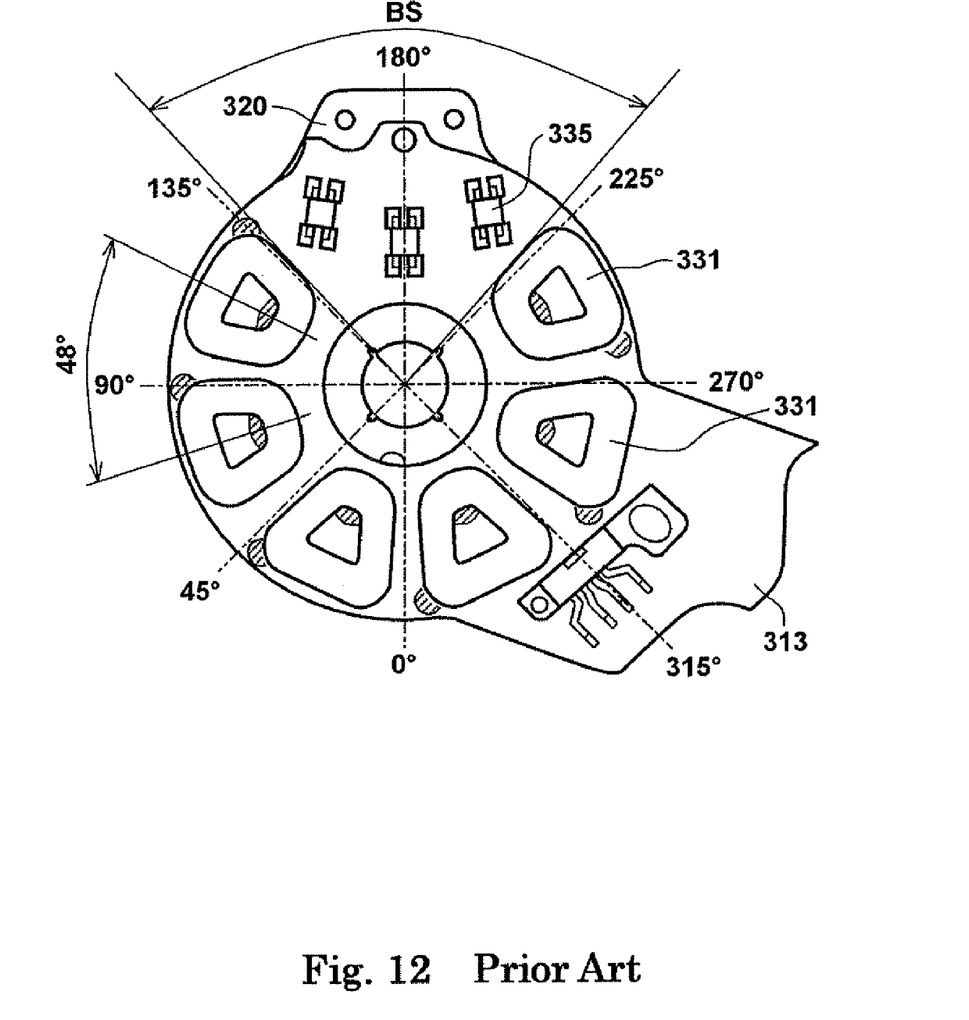
FIG. 12 is a fragmentary view of the stator section of the other conventional brushless motor according to the other prior art.

FIG. 12 is a fragmentary view of the stator section of the other conventional brushless motor according to the other prior art.

Currently, brushless motors have been used in various electronic equipment. For instance, a brushless motor is used in a VTR (video tape recorder) as a motor for driving a tape and in a magnetic disc drive as a motor for driving a disc.

With respect to a prior art, such a brushless motor is disclosed in the Japanese publication of unexamined utility patent applications No. 6-2963/1994. The brushless motor disclosed in the Japanese publication of unexamined utility patent applications No. 6-2963/1994 is a capstan motor for driving a tape in a VTR, and constituted so as to be able to accurately achieve perpendicularity of a bearing holder and a rotary shaft with respect to a stator substrate.

More specifically, a joint surface of the bearing holder with respect to the stator substrate is approximately formed in a columnar shape with centering the rotary shaft, and resulting in enabling to achieve perpendicularity of the rotary shaft.

With referring to FIGS. 8-11, the conventional brushless motor 200, which is a capstan motor for being used in a camcorder, is described hereupon.

In FIG. 9, a motor base 210 that is molded from a material of resin is composed of a basement 211 and a pillar 215 that is provided upright on the basement 211. The basement 211 and a top end portion 216 of the pillar 215 are formed with a hole 211a and a hole 216a respectively, wherein each center axis of the holes 216a and 211a is common to each other. A ball bearing 222 is force fitted into the hole 211a of the basement 211.

Further, a ring pier 212, which protrudes downward on the bottom of the basement 211, is integrally formed around the hole 211a of the basement 211.

A hole of a back yoke 220 is fitted on the outer circumferential surface of the ring pier 212 and fixed thereto. The back yoke 220 is made from a magnetic material such as iron sheet, and provided with the hole almost in the middle. In this connection, an outer ring of the ball bearing 222 is positioned by the inner surface of the hole 211a and the back yoke 220 is positioned by the outer circumferential surface of the ring pier 212.

A sintered bearing 223 is force fitted into the hole 216a of the top end portion 216 of the motor base 210. Then the top end portion 216 is caulked, so that the sintered bearing 223 is fixed thereto firmly.

By the ball bearing 222 and the sintered bearing 223, a rotary shaft 225 made from stainless steel is rotatably supported.

On the bottom surface of the back yoke 220, as shown in FIG. 11, a plurality of driving coils 231, which are formed almost in a ring shape having a hollow section by winding a conducting wire around the hollow section, are provided around the rotary shaft 225. More accurately, six driving coils 231 are arranged at angular intervals of 60 degrees.

Further, as shown in FIG. 11, a hall element 235 is mounted in each hollow section of the three driving coils 231 that are adjacent to each other on the surface of the back yoke 220. The hall elements 235 are used for alternating electric power to be supplied to the driving coils 231.

Referring back to FIG. 9, description is given to a rotor section. The rotary shaft 225 protrudes through the ball bearing 222 downward, and a rotor section is mounted on a protruded portion 225a of the rotary shaft 225 so as to be integrated with the rotary shaft 225.

The rotor section is composed of a bushing 219, a rotor yoke 228, a gear 230, a driving magnet 224 and a plastic magnet 229 for frequency generator (hereinafter referred to as FG magnet 229).

More specifically, the bushing 219 that is made from brass is fixed on the protruded portion 225a of the rotary shaft 225, and the rotor yoke 228 is fixed around the bushing 219.

A gear 230 that is made from plastic is force fitted on a bottom end portion of the bushing 219. A timing belt not shown in the figure is extended around the gear 230, and drives a reel of a VTR.

The rotor yoke 228 is formed in a flat cup shape having a surrounding wall 228a.

The driving magnet 224, which is made from a rare earth material and formed in a flat ring shape, is adhered on an inner surface of the surrounding wall 228a of the rotor yoke 224.

The driving magnet 228 is magnetized in eight poles in a circumferential rotating direction.

Further, a top surface of the driving magnet 224 confronts with a bottom surface of the driving coil 231 with maintaining a prescribed gap "g" between them.

An outer circumferential surface of the surrounding wall 228a of the rotor yoke 228 is integrally provided with the FG magnet 229 by a so-called outsert forming method (a projection forming method of engineering plastics).

By means of the FG magnet 229, an MR sensor 232, which is provided outside an array of the driving coils 231 as shown in FIG. 11, generates an FG signal.

In accordance with the FG signal, a rotational speed of the brushless motor 200 is adjusted to be a constant speed by controlling electric current supplied to each driving coil 231 through a flexible printed circuit board (herein after referred to as FPC) 213.

Generally, combinations of number of driving coils (Nc) and number of magnetic poles (Nm) to be selected are essentially as follows in case number of electric phases of a driving motor is three.

(Nc, Nm)=(3, 2), (3, 4), (6, 4), (6, 8), (9, 6), (9, 12), (12, 16), and so on.

In such a combination in which the number of magnetic poles (Nm) is 2n or 4n with respect to the number of driving coils (Nc) that is 3n, where "n" is a natural number, driving coils are evenly disposed in a circumferential area, with centering a rotary shaft.

Therefore, a belt for driving a reel could not be extended inside a magnetic circuit of the motor, and resulted in being obliged to be extended outside the magnetic circuit. Consequently, the motor was hardly made thinner in profile.

In this connection, a motor, which was intended to be made thinner in profile, has been proposed. The motor was provided with an angular area in which no driving coil was disposed with centering a rotary shaft.

Further, a hall element and a belt for driving a reel through a gear were disposed within the angular area.

Furthermore, the motor is configured such that combinations of number of driving coils (Nc) and number of magnetic poles (Nm) are defined as (Nc, Nm)=(3, 6), (6, 6), (6, 10), (9, 8), (9, 14), (12, 10), (12, 18), and so on.

In other words, the combinations are defined such that the number of magnetic poles (Nm) is "2n+2" or "4n+2" with respect to the number of driving coils (Nc) that is 3n, wherein "n" is a natural number, a not disposed angular area in which no coil is disposed within an angular range equivalent to two magnetic poles is provided, and a hole element and a belt are disposed therein.

Such a configuration of disposing driving coils is shown in FIG. 12.

As shown in FIG. 12, six driving coils 331 are disposed at angular intervals of 48 degrees, and an angular range from 135 degrees to 225 degrees approximately is provided as a not disposed angular area BS in which no driving coil is disposed.

Further, in FIG. 12, three hall elements 335 are disposed in the not disposed angular area BS.

By this configuration, an amount of magnetic flux interlinking with the driving coils 331 in total decreases, so that efficiency is deteriorated. However, there exists a merit of making the motor thinner in profile.

In the meanwhile, recently, market demands for a motor such as making smaller in size and improving performance higher are strong, so that component parts constituting a motor must be miniaturized and thinned in profile. However, miniaturizing and thinning decrease strength of component parts themselves.

In the above-mentioned conventional brushless capstan motor for camcorders, if the motor is thinned, a gap between the driving magnet 224 and the back yoke 220 or 320 is inevitably narrowed, and resulting in strengthening magnetic suction power. Consequently, the back yoke 220 or 320 is deformed furthermore.

In particular, as mentioned above, in case of the motor that is provided with the not disposed angular area BS in which no driving coil 331 is disposed around the rotary shaft 225 on the back yoke 320 through an FPC 313, the area in which the driving coils 331 are disposed is reinforced by adhering the driving coils 331 therein, and results in increasing flexural strength in comparison with the not disposed angular area BS in which no driving coil 331 is disposed.

As a result, the back yoke 320 is unevenly deformed toward the driving magnet 224 side by the magnetic suction power of the driving magnet 224.

In this connection, the gap "g" between the driving coils 331 and the driving magnet 224 is made uneven, and resulting in losing magnetic balance.

Accordingly, there exists problem such that wow and flutter (hereinafter referred to as W/F) and vibration increase.

Particularly, the back yoke 320 is defined as a base level of positioning for installation, in some cases, when installing a motor into a VTR or other electronic equipment. In this case, irregularity in flatness of the back yoke 320 directly reflects irregularity in perpendicularity of the rotary shaft 225. Consequently, affection of the irregularity in flatness of the back yoke 320 is extremely large.

An amount of deformation of the back yoke 320 in the longitudinal direction of the rotary shaft is shown in FIG. 8.

FIG. 8 is a result of measuring an amount of deformation at eight positions, which are disposed along a circle having a radius of approximately 11 mm from the rotary shaft at angular intervals of 45 degrees, wherein a position in the longitudinal direction of the rotary shaft at zero degree of the back yoke 320 having a radius of approximately 25 mm in FIG. 12 is defined as a reference height. The measurement is conducted before and after the rotor section is mounted in the stator section respectively.

Consequently, after the rotor section is mounted in the stator section, in other words, under a condition that the magnetic suction power of the driving magnet 224 acts on the back yoke 320, it is understood by FIG. 8 that deformation of the not disposed angular area BS in which no driving coil 331 is disposed is remarkably large. Particular, at an angle of around 180 degrees, the deformation reaches 150 μm maximal.

As mentioned above, providing a not disposed angular area in which no driving coil is disposed on a back yoke so as to thin a profile of a motor makes the back yoke deform unevenly due to magnetic action of a driving magnet, and resulting in making a gap between the back yoke and the driving motor uneven.

Accordingly, there exists the problem of increasing W/F and vibration.

SUMMARY OF THE INVENTION

Accordingly, in consideration of the above-mentioned problems of the prior art, an object of the present invention is to provide a brushless motor, which enables to be thin in profile, to achieve perpendicularity of a rotary shaft in higher accuracy, and is low in wow and flutter and low in vibration.

In order to achieve the above object, the present invention provides, according to an aspect thereof, a brushless motor comprising: a motor base; a rotary shaft rotatably supported by the motor base through a bearing; a back yoke in a shape of flat plate made from a magnetic material being supported by the motor base from one surface of the back yoke in a direction perpendicular to the rotary shaft in a neighborhood of the rotary shaft; a plurality of driving coils disposed on another surface of the back yoke opposite to the one surface confronting with the motor base; and a rotor yoke having a driving magnet in the shape of ring integrally rotating together with the rotary shaft while confronting the driving magnet with the plurality of driving coils with maintaining a prescribed gap between them, wherein the plurality of driving coils are disposed on the back yoke around the rotary shaft at angular intervals of a prescribed angle, and wherein the back yoke is provided with a not disposed angular area in which no driving coil is disposed on the other surface of the back yoke in an area within a prescribed angle around the rotary shaft, and the brushless motor further comprising a press contacting means for pressing the back yoke toward the driving magnet so as to deform the back yoke, wherein the press contacting means is provided between the motor base and the back yoke in an area axially opposite to the not disposed angular area with respect to the rotary shaft.

Other object and further features of the present invention will be apparent from the following detailed description when read in conjunction with the accompanying drawings.

DETAILED DESCRIPTION OF THE PREFERRED EMBODIMENTS

Figure 1:
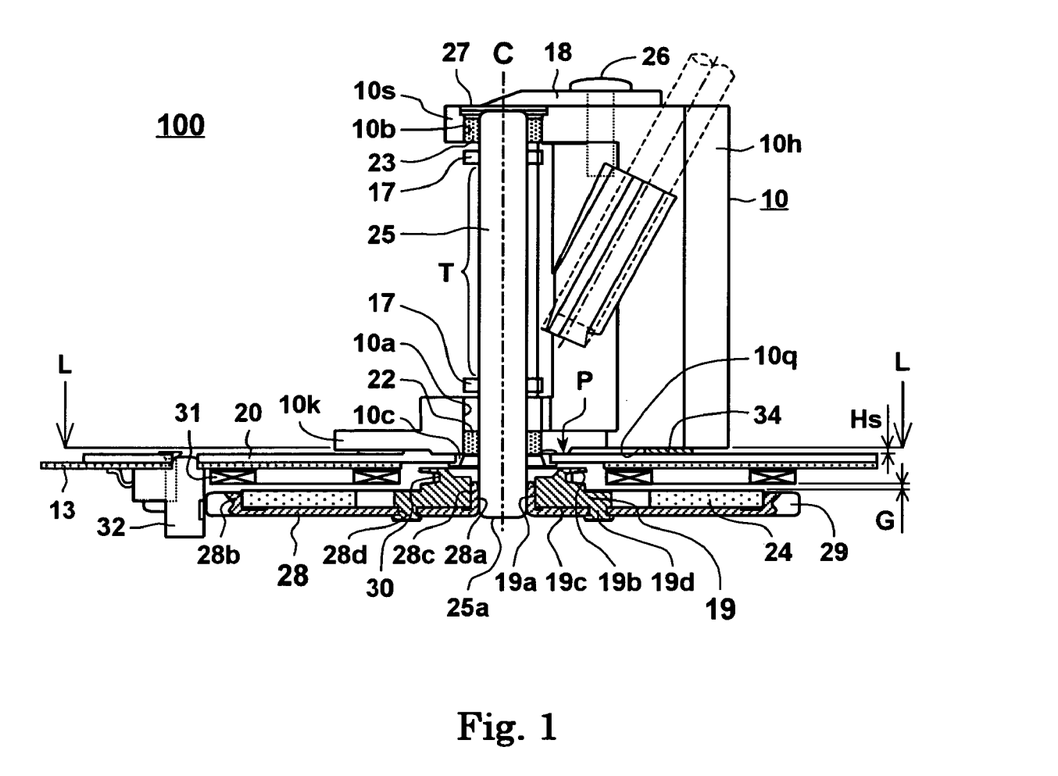
FIG. 1 is a cross sectional view of a brushless motor according to an embodiment of the present invention taken in the direction of the arrows substantially along the line M-M of FIG. 2.
Figure 2:
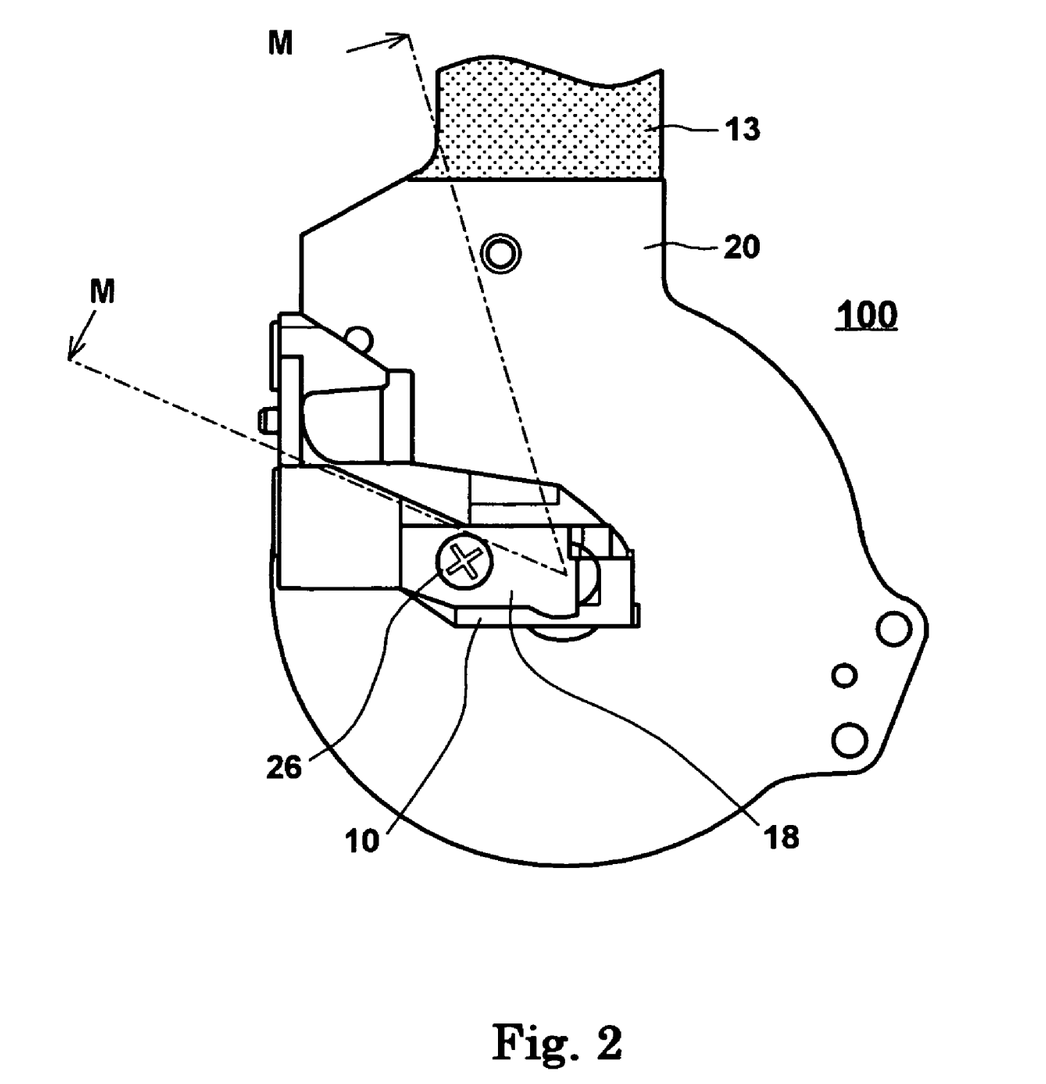
FIG. 2 is a plan view of the brushless motor shown in FIG. 1.

FIG. 1 is a cross sectional view of a brushless motor according to an embodiment of the present invention taken in the direction of the arrows substantially along the line M-M of FIG. 2.

FIG. 2 is a plan view of the brushless motor shown in FIG. 1.

Figure 3A:
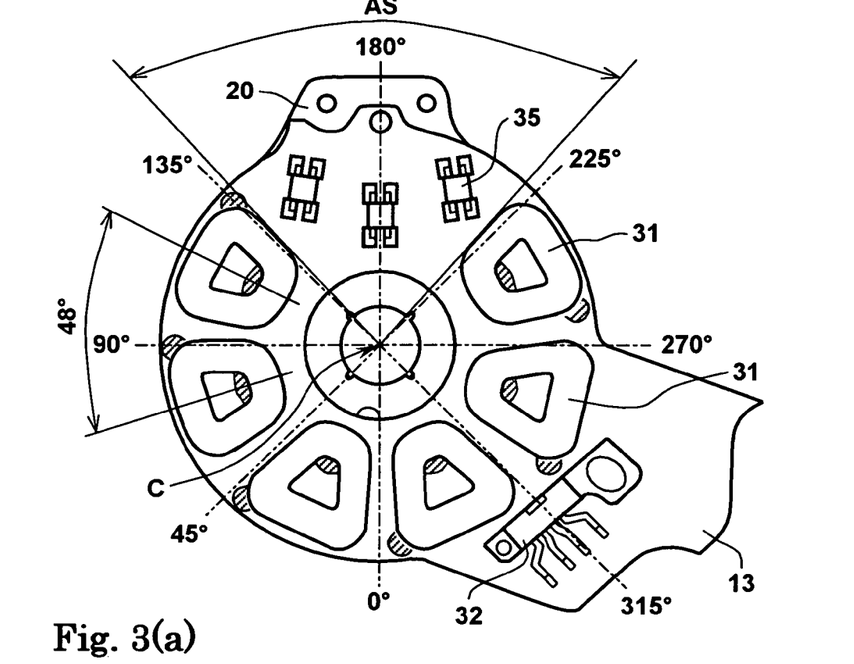
FIG. 3(a) is a fragmentary view of a stator section of the brushless motor shown in FIG. 1 exhibiting disposition of driving coils.

FIG. 3(a) is a fragmentary view of a stator section of the brushless motor shown in FIG. 1 exhibiting disposition of driving coils.

Figure 3B:
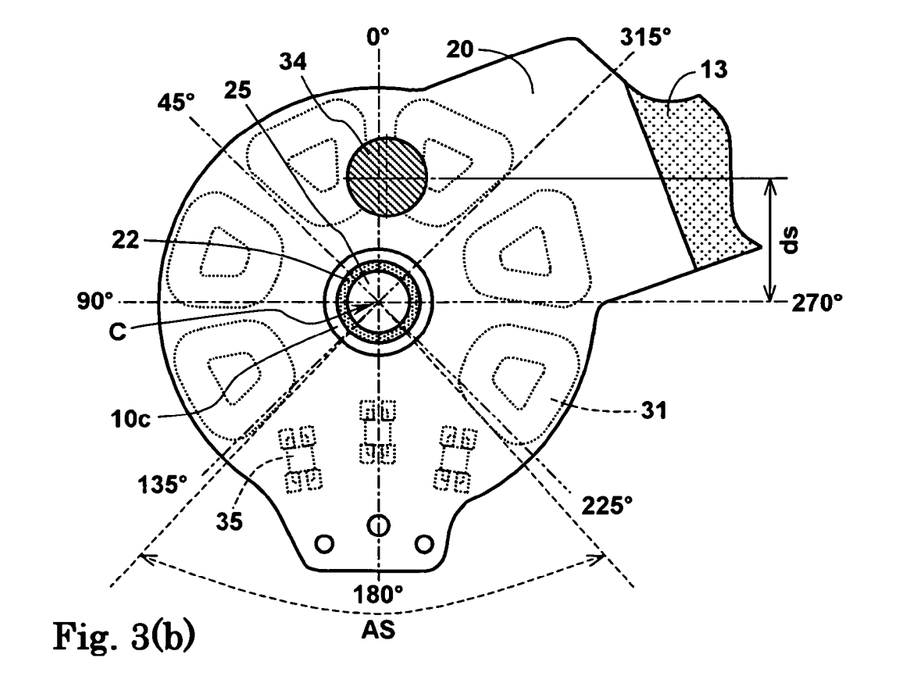
FIG. 3(b) is fragmentary view taken in the direction of the arrows substantially along the line L-L of FIG. 1 showing another side of the stator section opposite to the fragmentary view shown in FIG. 3(a).

FIG. 3(b) is fragmentary view taken in the direction of the arrows substantially along the line L-L of FIG. 1 showing another side of the stator section opposite to the fragmentary view shown in FIG. 3(a).

Figure 4:
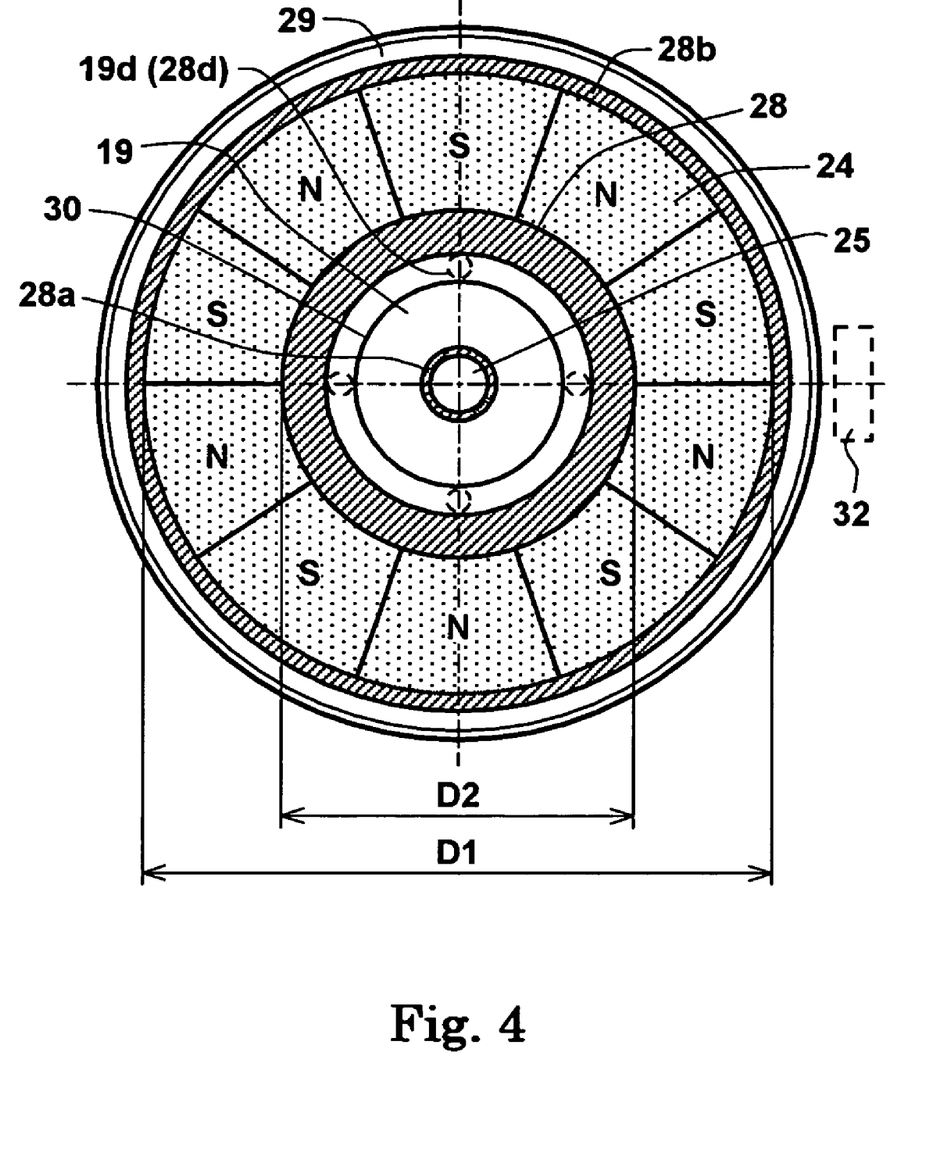
FIG. 4 is a plan view of a rotor section of the brushless motor shown in FIG. 1 exhibiting a magnetization condition of a driving magnet.

FIG. 4 is a plan view of a rotor section of the brushless motor shown in FIG. 1 exhibiting a magnetization condition of a driving magnet.

Figure 5:
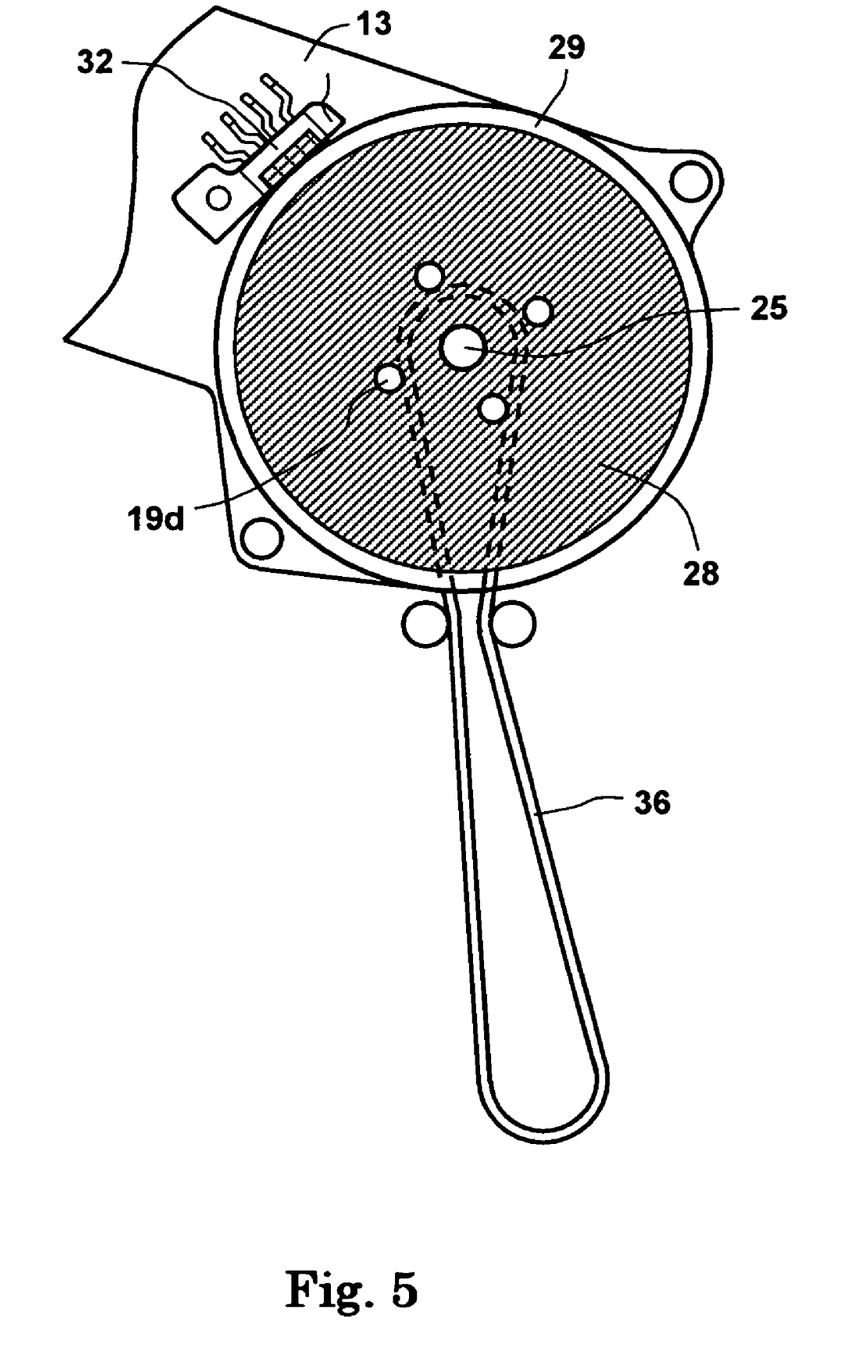
FIG. 5 is a bottom view of the brushless motor shown in FIG. 1, wherein a belt is fitted for exhibiting one application.

FIG. 5 is a bottom view of the brushless motor shown in FIG. 1, wherein a belt is fitted for exhibiting one application.

Figure 6:
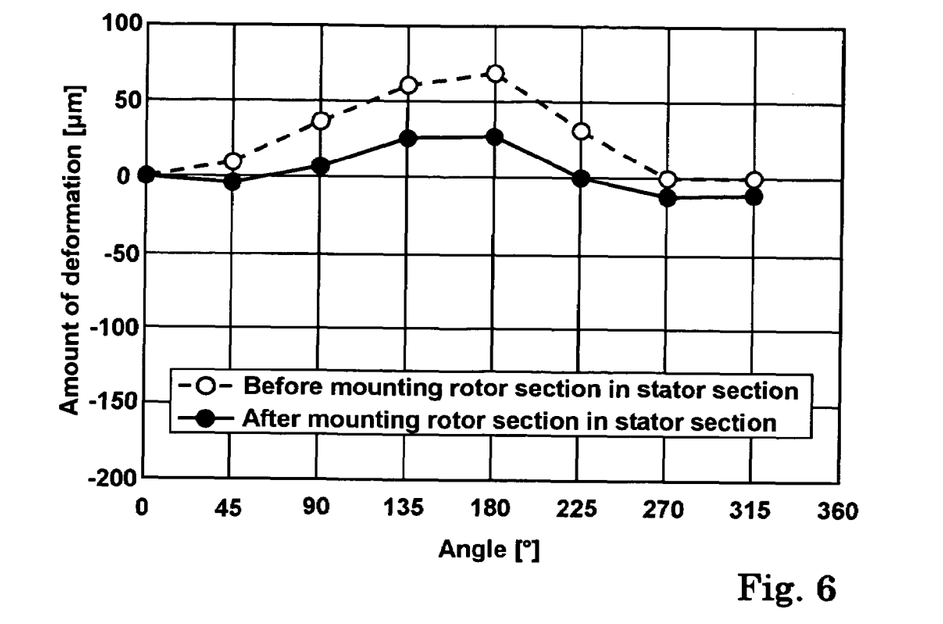
FIG. 6 is a graph exhibiting an amount of deformation of a back yoke in the brushless motor according to the embodiment of the present invention for explaining a flatness of the back yoke.

FIG. 6 is a graph exhibiting an amount of deformation of a back yoke in the brushless motor according to the embodiment of the present invention for explaining a flatness of the back yoke.

Figure 7:
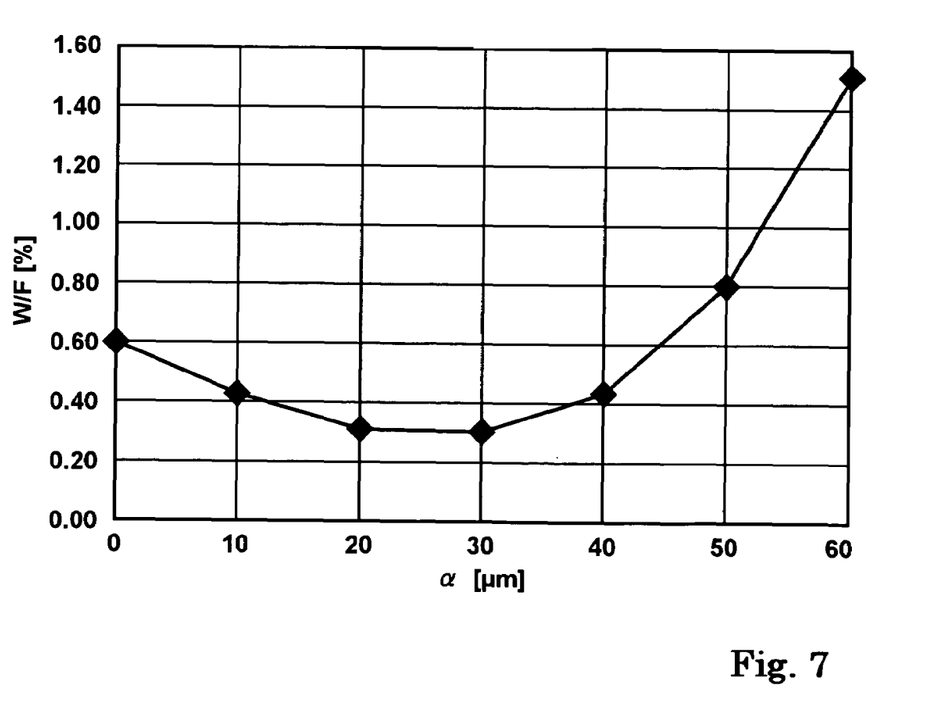
FIG. 7 is a graph exhibiting a relationship between a margin of deformation and W/F (wow and flutter) with respect to the brushless motor according to the embodiment of the present invention.

FIG. 7 is a graph exhibiting a relationship between a margin of deformation and W/F (wow and flutter) with respect to the brushless motor according to the embodiment of the present invention.

A brushless motor 100 according to an embodiment of the present invention is a capstan motor, which is composed of a stator section and a rotor section and used in a camcorder.

Further, in the embodiment, it is defined for the brushless motor 100 that a combination of number of driving coils (Nc) and number of magnetic poles (Nm) is (6, 10).

A stator section of the brushless motor 100 is depicted first.

As shown in FIG. 1, a stator section is composed of a motor base 10, a back yoke 20 and a driving coil 31.

The motor base 10 is made from aluminum die-cast and composed of a basement 10k and a pillar section 10h that is formed upright on the basement 10k.

Further, a top end supporting section 10s is provided on a top end side of the pillar section 10h.

Furthermore, holes 10a and 10b, which have a center axis common to them, are formed on the basement 10k and the top end supporting section 10s respectively.

More, sintered oil impregnation bearings 22 and 23 are force fitted into the holes 10a and 10b respectively. A rotary shaft 25 made from a stainless steel material is rotatably supported by the sintered oil impregnation bearings 22 and 23.

Moreover, a ring pier 10c, which protrudes downward on the bottom of the basement 10k, is integrally formed around the hole 10a of the basement 10k.

A mid hole is bored at almost a center of the back yoke 20. The mid hole is fitted on an outer circumferential area of the ring pier 10c of the motor base 10, and resulting in fixing the back yoke 20 on the bottom of the motor base 10. In the fixing process, the ring pier 10c is caulked to the mid hole of the back yoke 20, and the pillar section 10h of the motor base 10 results in standing erect perpendicular to the back yoke 20.

The back yoke 20 is formed in flat plate and made from a silicon steel plate having a thickness of 0.5 mm.

A flexible printed circuit board (hereinafter referred to as FPC) 13 is adhered on the bottom surface of the back yoke 20.

As shown in FIG. 3(a), six driving coils 31 are disposed on a bottom surface of the FPC 13, which functions as a stator circuit board, with surrounding the rotary shaft 25. More specifically, the driving coils 31 are installed along a circle, which is almost coaxial with respect to the rotary shaft 25, at angular intervals of a prescribed angle.

Further, on the FPC 13 outside an array of the driving coils 31, one MR element or a magnetic sensor 32, which is used for detecting an FG (frequency generator) pulse, is mounted so as to confront with an outer circumferential surface of an FG magnet 29 will be detailed later.

In the embodiment, as mentioned above, the brushless motor 100 is defined as the combination of six coils and ten magnetic poles, so that the prescribed angle of the angular intervals with respect to adjoining two driving coils 31 is designated to be 48 degrees as shown in FIG. 3(a).

In this connection, six driving coils 31 cover an angular range of "48°×5+(48°/2)×2=288°" approximately. Consequently, as shown in FIG. 3(a), there exists an angular area equivalent to "360°−288°=72°" in which no driving coil 31 is disposed. The angular area is denominated as a not disposed angular area "AS" hereupon.

In the embodiment, as shown in FIG. 3(a), three hall elements 35 for alternating electric current to be supplied to the driving coils 31 are disposed in the not disposed angular area Further, as it will be detailed later, as shown in FIG. 5, a belt 36 for driving a reel enables to be extended around a gear 30 through the not disposed angular area "AS".

The rotor section of the brushless motor 100 is depicted next.

The rotor section is mounted on a protruded portion 25a of the rotary shaft 25 so as to be integrated with the rotary shaft 25, wherein the protruded portion 25a protrudes downward through the sintered oil impregnation bearing 22. As shown in FIG. 1, the rotor section is composed of a bushing 19, a gear section 30 for driving a reel, a rotor yoke 28, a driving magnet 24 and a FG magnet 29.

The rotor yoke 28 has a hole 28a, which is bored in the middle of the rotor yoke 28 and fitted on the rotary shaft 25, and a surrounding wall 28b. Around the hole 28a, a rising section 28c is formed by the drawing process.

Further, the bushing 19 molded from resin is formed in a ring shape having a hole 19a in the middle, and the gear section 30 is formed around a top end portion 19b of the bushing 19.

Furthermore, four projections 19d that protrude downward are formed on a bottom end surface 19c of the bushing 19.

The rotor yoke 28 is provided with four holes 28d, which correspond to the projections 19d respectively. The respective projections 19d of the bushing 19 are inserted into the respective holes 28d of the rotor yoke 28, and the outer circumferential surface of the rising section 28c of the rotor yoke 28 is engaged with the inner circumferential surface of the hole 19a of the bushing 19. Then the projections 19d are caulked, and resulting in integrating the bushing 19 into the rotor yoke 28.

The driving magnet 24, which is made from a rare earth material and formed in ring shape, is adhered inside the surrounding wall 28b of the rotor yoke 28.

Further, the FG magnet 29 in ring shape is provided on the outer circumferential surface of the surrounding wall 28b.

Furthermore, the protruded portion 25a of the rotary shaft 25 is force fitted into the inner circumference of the rising section 28c of the rotor yoke 28, and resulting in integrating the rotary shaft 25 into the rotor section.

The driving magnet 24 and the FG magnet 29 are detailed hereupon.

In FIG. 4, the driving magnet 24 is formed in a ring shape of which an outer diameter D1 is 21.15 mm, an inner diameter D2 is 12 mm and a thickness is 1.15 mm, and made from a Nd—Fe—B system material that is one of rare earth magnetic materials.

Further, an outer surface of the driving magnet 24 is nickel plated.

On the other hand, the FG magnet 29 is made from resin, and formed around the outer circumference of the rotor yoke 28 by the so-called outsert forming method (projection forming method of engineering plastics).

A magnetization condition of the driving magnet 24 is shown in FIG. 4, wherein the driving magnet is adhered on the rotor yoke 28. FIG. 4 is a plan view of the rotor section, wherein the bushing 19 is integrated into the rotor yoke 28 and the rotary shaft 25 is fitted into the bushing 19.

As shown in FIG. 4, the driving magnet 24 is magnetized in ten magnetic poles or five pairs of magnetic poles along the inner circumferential wall surface of the surrounding wall 28b of the rotor yoke 28.

As mentioned above, the four projections 19d of the bushing 19 are fitted into the four holes 28d provided on the rotor yoke 28, wherein the bushing 19 is disposed inside the driving magnet 24 and integrally formed with the gear section 30 for driving a reel, and then the bushing 19 is mounted on the rotor yoke 28 through the ultrasonic caulking process.

The FG magnet 29 is provided along the outer circumference of the surrounding wall 28b of the rotor yoke 28, wherein the FG magnet is formed in a ring shape and magnetized in 294 magnetic poles or 147 pairs of magnetic poles in a circumferential direction so as to obtain an FG pulse, that is, a rotational speed signal.

Accordingly, the rotor yoke 28, the driving magnet 24 and the FG magnet 29 are integrally rotated, and the FG magnet 29 conducts the magnetic sensor 32 to generate an FG signal.

Referring back to FIG. 1, when the brushless motor 100 is installed in a VTR, a magnetic tape runs along the rotary shaft 25 within a range "T". In order to prevent oil that may leak from the sintered oil impregnation bearings 22 and 23 and flow into the tape running range "T", a pair of oil sealing rings 17 is inserted into the rotary shaft 25 at the both ends of the tape running range "T".

Further, in order to maintain a prescribed gap between the rotor section and the stator section, a thrust plate 18 is fixed on the motor base 10 by a screw 26 so as to regulate an axial position of the rotary shaft 25 through a thrust sheet 27.

Furthermore, by confronting the bottom surface of the driving coils 31 that are disposed on the FPC 13 as shown in FIG. 3(a) with the upper surface of the driving magnet 24 while maintaining a prescribed slight gap "G" between the driving coil 31 and the driving magnet 24 as shown in FIG. 1, the brushless motor 100 is constituted so as to be able to obtain sufficient rotational driving force.

As shown in FIG. 3(b), the brushless motor 100 according to the embodiment of the present invention is provided with a spacer section 34, which is a part of the motor base 10. The spacer section 34 is disposed in a position that is symmetrical with respect to the not disposed angular area "AS" through almost 180 degrees and protrudes from a bottom surface 10q of the motor base 10 so as to contact with the back yoke 20.

In the embodiment, as shown in FIG. 3(b), the spacer section 34 is formed in a circular shape. However, it shall be understood that the shape of the spacer section 34 is not limited to be circular.

More specifically, the spacer section 34 is formed in a circular shape having a diameter of 5 mm. The circular shape is excellently capable of the aluminum die-casting process. A center axis of the spacer section 34 is disposed sufficiently away from an axis "C" of rotation of the rotor section by a distance "ds" of 10 mm.

Further, the spacer section 34 is formed so as to protrude by 30 μm with respect to a reference height level of a reference point "P" shown in FIG. 1, wherein the reference point "P" is a point of contact between a bottom surface of the motor base 10 and a top surface of the back yoke 20 in the neighborhood of the rotary shaft 25. In other words, the spacer section 34 pushes the back yoke 20 downward by 30 μm with respect to the reference height level. Consequently, a margin "α" of deformation, which deforms the back yoke 20, is 30 μm.

The bottom surface 10q of the motor base 10 in a circumferential area of the spacer section 34 is away from the top surface of the back yoke 20 by 20 mm. In other word, the bottom surface 10q of the motor base 10 in the circumferential area of the space section 24 is higher than the reference height level by 20 mm, so that the spacer section 34 is formed so as to be protruded by a height "Hs" of 0.23 mm with respect to the bottom surface 10q of the motor base 10.

Accordingly, the back yoke 20 that is fixed to the motor base 10 is deformed so as to approach the driving magnet 24 by 30 μm with respect to the reference height level of the reference point "P" at the spacer section 34. On the contrary, an area of the back yoke 20, which is symmetrical to the spacer section 34 with respect to the rotary shaft 25, is deformed so as to be away from the driving magnet 24.

In rephrasing more specifically, on the back yoke 20, an area that is symmetrical with respect to the not disposed angular area "AS" through almost 180 degrees is deformed toward the rotor section by the spacer section 34 when the back yoke 20 is fixed to the motor base 10 by caulking. On the contrary, the not disposed angular area "AS" is deformed toward other direction opposite to the rotor section.

In this configuration, when the rotor section is mounted in the stator section, the back yoke 20, particularly, the not disposed angular area "AS" is apt to be deformed extremely toward the rotor section by means of magnetic suction power of the driving magnet 24 because the back yoke 20 is weak in flexural strength.

In this connection, deformation caused by the spacer section 34 is compensated by deformation caused by the magnetic suction power of the driving magnet 24, and resulting in decreasing an amount of deformation of the back yoke 20.

Accordingly, flatness of the rotor yoke 28 in total is remarkably improved.

A result of measurement of the amount of deformation is exhibited in FIG. 6.

The measurement is conducted into eight positions on the back yoke 20 having a diameter of around 25 mm, wherein the eight positions are disposed along a circumference having a radius of around 11 mm with centering the axis "C" of rotation at angular intervals of 45 degrees, and wherein one point out of the eight points that is disposed at zero degree (0°) shown in FIG. 3(a) is defined as a reference point of which height in the axial direction is defined as a reference height (±0 μm). The measurement is conducted before and after the rotor section is mounted in the stator section.

In FIG. 6, a negative value of an amount of deformation denotes that a position of measurement on the back yoke 20 is shifted downward to the rotor section side with respect to the reference height. On the contrary, a positive value denotes that a position of measurement is shifted upward to the motor base 10 side.

Consequently, as shown in FIG. 6, after the rotor section is installed in the stator section, in other words, when magnetic suction power of the driving magnet 24 acts against the back yoke 20, it is understood that an amount of deformation of the not disposed angular area "AS", which is disposed with no driving coil and covers an angular area with centering on around the axis of 180 degrees (180°), is suppressed to the order of 25 μm at most.

When the measurement is compared with that of the conventional brushless motor excluding such a spacer section 34, as shown in FIG. 8, the amount of deformation of the conventional brushless motor reaches to 150 μm maximum. Consequently, it is understood that the spacer section 34 exhibits excellent effect such that the amount of deformation of the back yoke 20 of the brushless motor 100 according to the embodiment of the present invention is almost one sixth of that of the conventional brushless motor.

Accordingly, flatness of the back yoke 20 is greatly improved, and resulting in maintaining perpendicularity of the rotary shaft 25 in higher accuracy.

Succeedingly, measurement is conducted into variations of W/F (wow and flutter) in response to variations of a protrusion amount of the spacer section 34. A result of measurement is shown in FIG. 7.

FIG. 7 is a graph exhibiting a result of measurement with respect to relationship between a protrusion amount and W/F by producing a plurality of brushless motors of which protrusion amount of the spacer section 34 is varied by stages.

As shown in FIG. 1, the motor base 10 contacts with the back yoke 20 only in an area neighborhood of the section engaging with the back yoke 20 including the reference point "P". The other area except for the spacer section 34 is provided with a gap between the motor base 10 and the back yoke 20. Accordingly, in FIG. 7, the X-axis exhibits the margin "α" of deformation, which denotes that the spacer section 34 deforms the back yoke 20, for easier understanding.

According to the result of the measurement, as it is apparent from FIG. 7, W/F decreases in accordance with the margin "α" of deformation that increases from 0 μm, that is, from the reference height of the spacer section 34 at where the spacer section 34 contacts with the back yoke 20. W/F reaches to a lower limit at the margin "α" of deformation within a range of 20 to 30 μm. W/F gradually increases when the margin "α" of deformation exceeds 30 μm and rapidly increase when the margin "α" of deformation exceeds 50 μm.

With respect to an amount of deformation of the back yoke 20 caused by the spacer section 34, it is supposed that there exists an extent of adequate amount of deformation for improving flatness of the back yoke 20. Consequently, flatness is adversely deteriorated, and resulting in worsening W/F in case the amount of deformation exceeds the extent.

In this connection, it is understood by FIG. 7 that the most adequate amount of deformation or margin "α" of deformation is within a range of 20 to 30 μm.

An allowable limit of W/F is 0.5% or less in general, so that a margin "α" of deformation of the spacer section 34 shall be set to within a range of 10 to 40 μm.

While the invention has been described above with reference to a specific embodiment thereof, it is apparent that many changes, modification and variations in materials and the arrangement of equipment and devices can be made without departing from the invention concept disclosed herein.

For instance, in the embodiment, the spacer section 34 is formed in a circular shape. However, as mentioned above, a cross section of the spacer section 34 is not limited to be a circular. The spacer section 34 enables to be formed in any cross section such as rectangular, elliptic and arbitrary shape corresponding to the shape and stiffness of the motor base 10.

Further, in order to maintain an appropriate margin "α" of deformation, it is also acceptable that the back yoke 20 is mounted on the motor base 10 at a slant with respect to the motor base 10 by providing an inclination for the motor base 10 or an individual spacing member is inserted into a space between the back yoke 20 and the motor base 10.

In case of the configuration of providing such a spacing member between the back yoke 20 and the motor base 10 so as to provide a margin "α" of deformation, which deforms the back yoke 20 by a prescribed amount, the same effect as that caused by the spacer section 34 is achieved. Therefore, in particular, a configuration of providing such a spacing member is not limited to a specific one.

Furthermore, in the embodiment of the present invention, as mentioned above, the brushless motor 100 is designated such that the combination of number of driving coils (Nc) and number of magnetic poles (Nm) is (6, 10). However, the combination (Nc, Nm) is not limited to be (6, 10). There exists various kind of combinations such as (3, 6), (6, 6), (6, 10), (9, 8), (9, 14), (12, 10), (12, 18) and so on.

In addition thereto, the embodiment of the present invention is described in a so-called shaft rotational type motor. However, the present invention is also applied for a motor in which a rotary shaft is fixed to a motor base and a bearing rotates together with a rotor section, that is, a so-called shaft fixed type motor.

It should be understood that many modifications and adaptations of the invention will become apparent to those skilled in the art and it is intended to encompass such obvious modifications and changes in the scope of the claims appended hereto.

What is claimed is:

1. A brushless motor comprising:
   a motor base;
   a rotary Shari rotatably supported by the motor base through a bearing;
   a back yoke in a shape of flat plate made from a magnetic material being supported by the motor base from a first surface of the back yoke in a direction perpendicular to the rotary Shari in a neighborhood of the rotary shaft;
   a plurality of driving coils disposed on a second surface of the back yoke opposite to the first surface confronting with the motor base; and
   a rotor yoke having a driving magnet in the shape of a ring integrally rotating together with the rotary Shari while confronting the driving magnet with the plurality of driving coils while maintaining a prescribed gap between them,
   wherein the plurality of driving coils are disposed on the back yoke around the rotary shaft within a first angular area at angular intervals of a prescribed angle, and
   wherein the back yoke is provided with a second angular area in which no driving coil is disposed on the second surface of the back yoke in an area within a prescribed angle around the rotary shaft, and
   the brushless motor further comprising a press contacting means for pressing the back yoke toward the driving magnet so as to deform the back yoke, wherein the press contacting means is provided between the motor base and the back yoke in the first angular area axially opposite to the second angular area with respect to the rotary shaft.

2. The brushless motor according to claim 1, wherein the press contacting means is a spacer section provided between the motor base and the back yoke.

3. The brushless motor according to claim 2, wherein the space section is formed integrally with the motor base.

4. The brushless motor according to claim 2, wherein a positional relationship between the spacer section and the second angular section is 180 degrees with centering on the rotary shaft.

5. The brushless motor according to claim 1, wherein an amount of deformation of the back yoke caused by the press contacting means is within a range of 10 to 40 μm.

* * * * *